United States Patent
Wu (10) Patent No.: US 8,666,990 B2
(45) Date of Patent: *Mar. 4, 2014

(54) SYSTEM AND METHOD FOR DETERMINING AUTHORITY RANKING FOR CONTEMPORANEOUS CONTENT

(75) Inventor: Su-Lin Wu, San Carlos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 257 days.

This patent is subject to a terminal disclaimer.

(21) Appl. No.: 12/724,087

(22) Filed: Mar. 15, 2010

(65) Prior Publication Data

US 2011/0225140 A1 Sep. 15, 2011

(51) Int. Cl.
- G06F 7/00 (2006.01)
- G06F 17/30 (2006.01)
- G06K 9/40 (2006.01)

(52) U.S. Cl.
USPC .................. 707/748; 707/709; 382/254

(58) Field of Classification Search
USPC .................................. 707/709, 748
See application file for complete search history.

(56) References Cited

U.S. PATENT DOCUMENTS

| | | | |
|---|---|---|---|
| 2006/0026194 A1* | 2/2006 | Bhushan et al. | 707/102 |
| 2006/0248076 A1* | 11/2006 | Troy et al. | 707/5 |
| 2009/0210441 A1* | 8/2009 | Mercer et al. | 707/102 |
| 2009/0274384 A1* | 11/2009 | Jakobovits | 382/254 |
| 2009/0319484 A1* | 12/2009 | Golbandi et al. | 707/3 |
| 2010/0262610 A1* | 10/2010 | Acosta et al. | 707/748 |

* cited by examiner

Primary Examiner — Ajay Bhatia
Assistant Examiner — Cheryl M Shechtman
(74) Attorney, Agent, or Firm — Pillsbury Winthrop Shaw Pittman LLP

(57) ABSTRACT

Methods and systems are provided for weighting contemporaneous content includes, in response to a user content request, by determining a plurality of contemporaneous content items relating to the user content request, the contemporaneous content items including, ultra-fresh content items having been only recently generated. For each of the contemporaneous content items, one or more authors of the content items are identified, and an expertise level for the one or more authors and an expert weighting for each of the content items based on the expertise level for the corresponding one or more authors are determined. Weighting the contemporaneous content includes ranking the contemporaneous content items in response to the user content request based on the expert weighting and presenting at least a portion of the contemporaneous content items in response to the user content request.

17 Claims, 4 Drawing Sheets

SYSTEM AND METHOD FOR DETERMINING AUTHORITY RANKING FOR CONTEMPORANEOUS CONTENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to search engines and more specifically to systems and methods for processing and improving search results for current real-time trends and/or events by providing expert recommendation weights to search results.

BACKGROUND OF THE INVENTION

Conventionally, a querying user submits a search query containing one or more search terms to a search engine. The search terms are matched against terms in an index of web content and a list of results is generated based at least in part on how well the content of particular web pages match the search terms by the search engine. Web pages returned by the search engine are usually retrieved from the World Wide Web by web crawlers. In response to a search request, the search engine returns result sets in an ordered listing. The reliability of search results often depends on various factors, including the collection of the information, processing of the information, the information source and user feedback on the veracity of this information.

Problems can arise when there is a dramatic increase in activity for a particular search trend because of problems with not only determining the right contemporaneous information, but also the reliability of this information. Standard search terms can be easily and readily handled using existing search technology, for example a user conducting a search to find information on a vacation to Las Vegas.

A dramatic increase in activity typically represents a corresponding real world occurrence and users seeking out information of this real world occurrence in a time-sensitive manner. For example, suppose a natural disaster occurs or a rumor emerges that a company is about to launch a ground-breaking new product, there will be a corresponding increase in people searching for this information.

Current web searching technology suffers from an ability to successfully account for contemporaneous information. There is a growing trend for highly contemporaneous information achieving a critical mass of distribution in a very short time frame. This increase in contemporaneous information is predicated on the wide use and quick dissemination of information occurring in the current electronic world.

The conversion of the Internet from a passive online informational source to a de facto medium for information distribution, combined with the new tools for increases in contemporaneous content generation, complicates existing web searching technology. Examples of contemporaneous information may include data feeds, such as social media feeds, really simple syndication (RSS) feeds, web logs, etc. Prior techniques of crawling the Internet, cataloging and then searching these corpora suffer from a lack of proper accounting for these contemporaneous data sources.

With developments in search engine technology to account for these feeds, problems can arise in the reliability of this information. For example, just because a search engine may describe a social media feed that includes information relating to the event, there is no way to trust the source of this feed. Therefore, there exists a need for improving search results correlating to real-time information searches by accounting for expert weighting of sources in the search result.

SUMMARY OF THE INVENTION

The present invention provides a method and system for weighting contemporaneous content including, in response to a user content request, determining a plurality of contemporaneous content items relating to the user content request, the contemporaneous content items including ultra-fresh content items having been only recently generated. In the method and system, for each of the contemporaneous content items, identifying one or more authors of the content items and determining an expertise level for the one or more authors and determining an expert weighting for each of the content items based on the expertise level for the corresponding one or more authors. The method and system further includes ranking the contemporaneous content items in response to the user content request based on the expert weighting and presenting at least a portion of the contemporaneous content items in response to the user content request.

Thereby, in the method and system, search results include contemporaneous content, where that content is then included in the search results being ranked based on authority scores associated with the authors. The method and system provides a technique for managing the contemporaneous content in a useful manner for providing high quality and useful content to users in response to content requests, where traditional techniques for authority ranking the content is not yet available due to the ultra-fresh nature of the content.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Embodiments of the present invention provide systems and methods for ranking contemporaneous content. As used herein, the term "contemporaneous content" may be viewed as ground-breaking or real-time content having been only recently generated and not viewable by a large number of readers or viewers. Contemporaneous content may also be considered or referred to as ultra-fresh content. Contemporaneous content may include up-to-date information and may be dynamic due to its time-sensitive nature. Contemporaneous content is distinguished from indexed web content such that indexed content items have been available on the Internet for enough time, allowing statistical information to be gathered over time for the indexed content items, and having been established as a reliable information source so as to be collected by a web crawler and indexed with the gathered information by the search engine. Web crawling and gathering statistical information on content items is very time-consuming and laborious.

The information gathered for the indexed content items are also used in the ranking of the content items by the search engine. However, contemporaneous content is time-sensitive and once subjected to such processes may render once contemporaneous content no longer contemporaneous. Without user click history or links to use to assess the value of these documents, sufficient information cannot be obtained to characterize and rank contemporaneous content.

Examples of contemporaneous sources may be any source that includes information in real time or in a timely fashion likely, for example a social network feed, answers to a question forum, micro-documents such as instant messages, twitter feeds, RSS feeds, etc. Other examples of sources of contemporaneous content may include but are not limited to community boards, Q&A, syndication feeds, or micro-documents such as, instant messages, forums and blogs. As such, the present system and method provides weighting of the authority level of content based on the authority level of the author(s).

Figure 1:
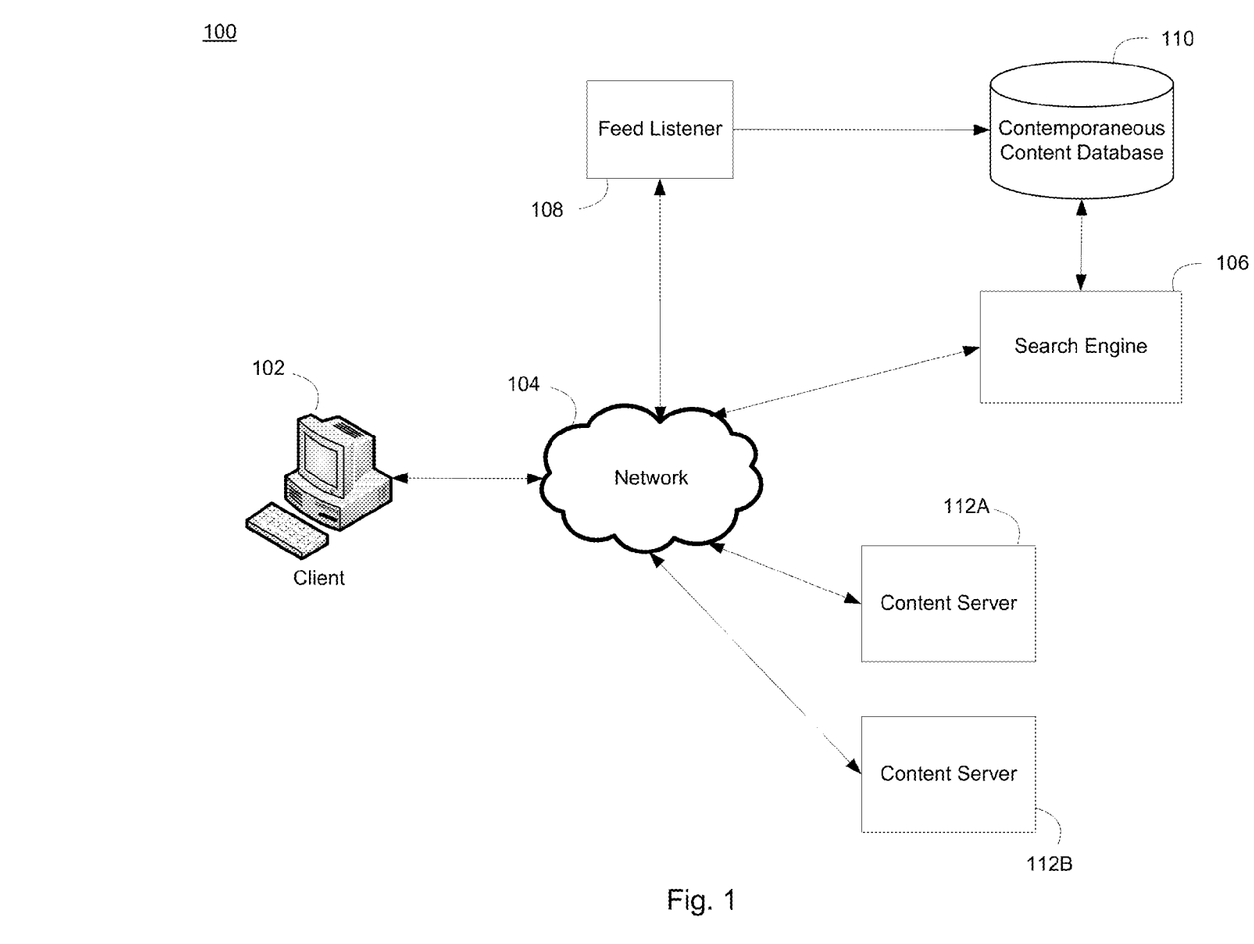
FIG. 1 illustrates a computing system according to an embodiment of the present invention.

FIG. 1 illustrates a system 100 that includes a Client 102, Network 104, Search Engine 106, Feed Listener 108, Contemporaneous Content Database 110 and Content Servers 112A and 112B.

Client 102 may include a desktop personal computer, workstation, terminal, laptop, personal digital assistant (PDA), cell phone, or any computing device capable of connecting to a network. Client 102 may also include a graphical user interface (GUI) or a browser application provided on a display (e.g., monitor screen, LCD or LED display, projector, etc.).

Network 104 may be any suitable type of network allowing data communications across thereof. In a typical embodiment, the network may be the Internet, following known Internet protocols for data communication, or any other communication network, e.g., any local area network (LAN), or wide area network (WAN) connection.

Search Engine 106 is one or more processing components disposed on one or more processing devices or systems in a networked environment. The Search Engine 106 may operate similar to known search engine technologies, but with the inclusion of additional processing capabilities describes herein. The search engine 106 is operative to receive search requests and process the requests to generate search results to the Client 102 across the Network 104.

The Feed Listener module 108 is illustrated as being separate from the search engine 106, but it is recognized that this module may be incorporated therein. The Feed Listener 108 is a processing device or system operative to perform gathering of contemporaneous content items and then populating the Contemporaneous Content Database 110. Additionally, Feed Listener 108 includes processing operations for determining contemporaneous sources for real-time information.

Feed Listener 108 receives or gathers contemporaneous content from a plurality of services and sources of contemporaneous content. These sources may be received from Content Servers 112a or 112b, further discussed in detail below. Contemporaneous content gathered by Feed Listener 108 adds additional entries into contemporaneous content database. In addition to gathering or receiving, Feed Listener 108 may also retrieve contemporaneous content.

One embodiment may feature Feed Listener 108 receiving contemporaneous content automatically in a passive manner, such as receiving a plurality of data streams from various ultra-fresh content sources, e.g. a twitter feed by way of example. In an alternative embodiment, Feed Listener 108 may actively retrieve contemporaneous content from one or more sources and services. In one embodiment, the module 108 may include technology crawling Internet content to populate the database 110. Feed Listener 108 may use either push or pull technology. Feed Listener 108 may also use synchronization technology to "listen" in on feeds, blogs or other contemporaneous content sources.

Search Engine 106, Feed Listener 108 and Contemporaneous Content Database 110 may all be part of a search provider and comprised of servers and other hardware or software.

The system 100 illustrates two sample contemporaneous sources from Content Servers 112a and 112b (collectively referred to as 112). The sources 112 can be any type of source that provides real-time information. A typical example may be a social network feed. For example, a Twitter® feed from various account users can be a real-time source. This real-time data feed provides large amounts of contemporaneous information, with significant uncertainty regarding the veracity of this information. Another source could be a really simple syndication (RSS) feed or other type of news or data feed, e.g. a stock ticker feed. These sources may also be referred to as "live" sources. Other examples may be, but not limited to Yahoo!® answers, forum postings, blog postings, blog comment postings, etc. It is recognized that there are other types of information sources that provide real-time content and the sources 112 are not limited by the examples listed above.

As the speed of information is received, there is the uncertainty of the trustworthiness of this information. In the system 100, the user may enter a search request to the Search Engine 106 via the Network 104. The search engine accesses Database 110 to find contemporaneous content results that correspond to the search inquiry, where based on the Feed Listener 108, the Database 110 includes real-time information from the contemporaneous sources 112.

Search results are provided back to the Client 102. The ranking of these results are affected by expert weighting of the authors for the contents in the results. In various embodiments, the results may be presented in different manners, for example one manner is to present a search engine results page that includes only contemporary content or a combination of contemporary content and indexed content. Another embodiment may include presenting the information to users in various other interfaces and is not expressly limited to a search engine interface. In one embodiment, determining an expert weighting for the authors including determining from past credentials, user feedback, ratings or popularity of the author.

Figure 2:
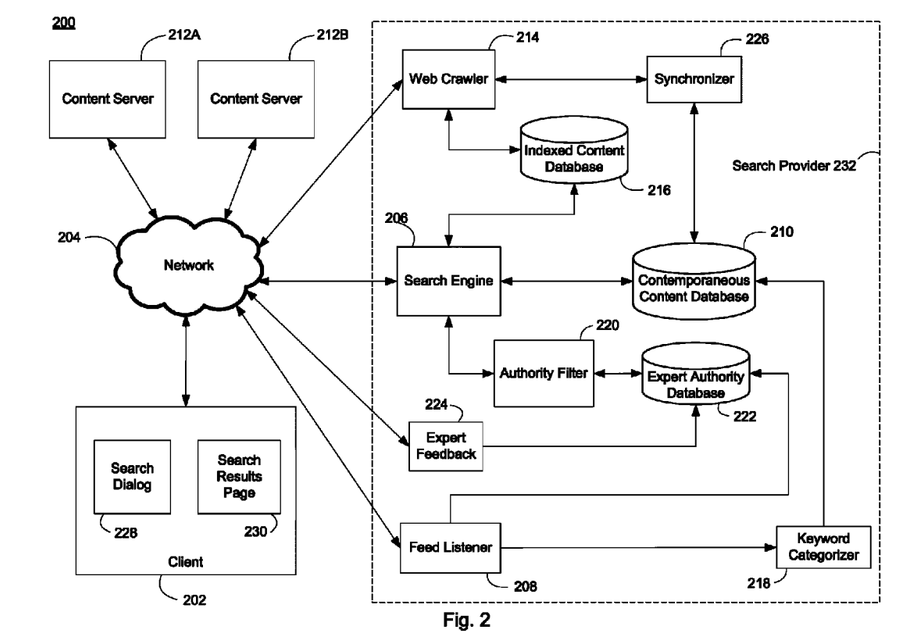
FIG. 2 illustrates another computing system according to an embodiment of the present invention.

FIG. 2 describes in further detail one embodiment of processing operations and subsequent methodologies for processing search requests for real-time information and providing improved search results to the Client 102 based on the expertise of the author as the source of the content. FIG. 2 illustrates, in an alternative embodiment, a System 200 for providing search services and ranking results of contemporaneous content, including a Client 202, Network 204, Search Engine 206 and Content Servers 212A and 212B (collectively referred to as 212). Client 202 may comprise Search Dialog 228 and Search Results Page 230, which may represent computer executable code that renders the front-end user experience for search operations, such as the user entering search terms in Search Dialog 228 and receiving search results in response thereto in Search Results Page 230. In one embodiment Client 202 interacts with a Search Provider 232 over Network 204.

Search Provider 232 may comprise Search Engine 206, Feed Listener 208, Contemporaneous Content Database 210, Web Crawler 214, Indexed Content Database 216, Keyword Categorizer 218, Authority Filter 220, Expert Authority Database 222, Expert Feedback 224 and Synchronizer 226.

Search Engine 206 is operative to receive search requests and process the requests to generate search results to the Client 202 across Network 204. Feed Listener 208 is operative to gather contemporaneous content and then populating the Contemporaneous Content Database 210 with contemporaneous content from Content Servers 212. Keyword Categorizer 218 may associate keywords with the contemporaneous content to categorize the content into Contemporaneous Content Database 210. The contemporaneous content may be categorized into an area of interest. The area of interest would help sort content items for retrieval by the search engine.

In addition to Feed Listener 208, Web Crawler 214 serves to retrieve content items from the Internet using crawling techniques to crawl web content. Web content crawled by Crawler 214 are stored in Indexed Content Database 216 where they are indexed with statistical information performance information, etc., by the search engine. In addition to contemporaneous content, the search engine may also be able to retrieve content items indexed in database 216 in response to a user request for content. Indexed content items may serve as additional content to supplement contemporaneous content items in search results. Crawler 214 may operate simultaneously with or separately from the Feed Listener 208 and both of which may be managed by a task scheduler.

Since content of the contemporaneous content are fairly new and are not afforded the data analysis by the aforementioned techniques, there is a lack of information pertaining to the accuracy, truthfulness and trustworthiness of the contemporaneous content, including authoritative data as to the content author(s) and source. According to a preferred embodiment of the invention, contemporaneous results are ranked based on a weighting of the expertise level of the author(s). That is, the usefulness or reliability of the contemporaneous content based on the credentials of an author(s) of a particular content item. In some embodiments, an author's expertise weighting may contribute more to the evaluation of a contemporaneous content's ranking than the actual text of the content item.

Authority Filter 220 may be accessed by Search Engine 206 to determine an authority ranking of results based on the author expert weighting of the content items to determine the veracity of the returned content items. Author expert weighting may be determined by Authority Filter 220 from expertise information stored in Expert Authority Database 222. Items in Expert Authority Database may be retrieved from Expert Feedback module 224. Feed Listener 208 may also be operative to receive expert authority information from the contemporaneous content sources and store the expert authority information in Expert Authority Database 222. Expert information may come from contemporaneous sources, found by the crawler or directly submitted from other users and experts.

Content items associated with authors of high expertise levels are ranked favorably and content associated with authors of low expertise levels are ranked unfavorably. Authors may be ranked or categorized into the following expertise categories: expert, advanced, intermediate, beginner, novice or unknown. Expertise information in database 222 may comprise author ratings, amount of expertise for an author, information pertaining to the reliability and usefulness of contents previously authored by an author. Other factors influencing the ranking of authors may be based on, but not limited to, the popularity of an author, reputation of an author, the amount of articles, books or other publications published by the author, the number of web hits directed to an author, expertise of the author in a specific area, the amount of feeds from the author, the amount of followers or friends an author, affiliation of an author to any online or social groups, a social networking ranking, past or present information of the author and feedback from online user or other experts. Further certain experts may be identified as fraudulent and are assigned a very low expertise level. Expert information may be collected for authors from many fields such as, health, science, legal, technology, environment, energy, automotive, finance, games, gambling, real-estate, movies, sports, gossip, travel and product reviews.

Synchronizer 226 may be operative to update contemporaneous content items in the database 210, based on information from crawler 214, such that content items crawled and/or indexed are deleted from database 210. Contemporaneous content items that have been deleted from database 210 exist as indexed content items in Indexed Content Database 216. Additional details of the Synchronizer 226 will be discussed more in detail. In one embodiment, Synchronizer 226 may also be a scheduler for performing scheduling operations such as performing contemporaneous content updates.

Search results page 230 may also be able to automatically refresh itself in response to an update of contemporaneous content. Refreshing of search results may be synchronous with a back-end processing system, such as receiving and uploading new content, or in another embodiment may be asynchronous, such as being a client-based operation not reloading the full search results, but rather only a portion, e.g. an AJAX environment by way of example. Updates in contemporaneous content may include the addition of new contemporaneous content and the removal of older content, no longer considered contemporaneous content. Updating of contemporaneous content may further include updating the ranking of contemporaneous content. In one embodiment, updating of contemporaneous content on the search results page may be done in the background or by means of a daemon. In another embodiment, the search results page may include a notification to a user that there are content updates available for a user's current page and prompts the user if they would like to refresh the results page. Updates may also be cached locally on Client 202 or in a web browser.

The above mentioned elements described in FIG. 1 and FIG. 2 may be implemented in hardware, software, or both. For further illustration of the systems of FIGS. 1 and 2, the operations of these systems are described in further detail regarding the methodologies of FIGS. 3 and 4. One or more processing devices in response to executable instructions may perform the methodologies described herein.

Figure 3:
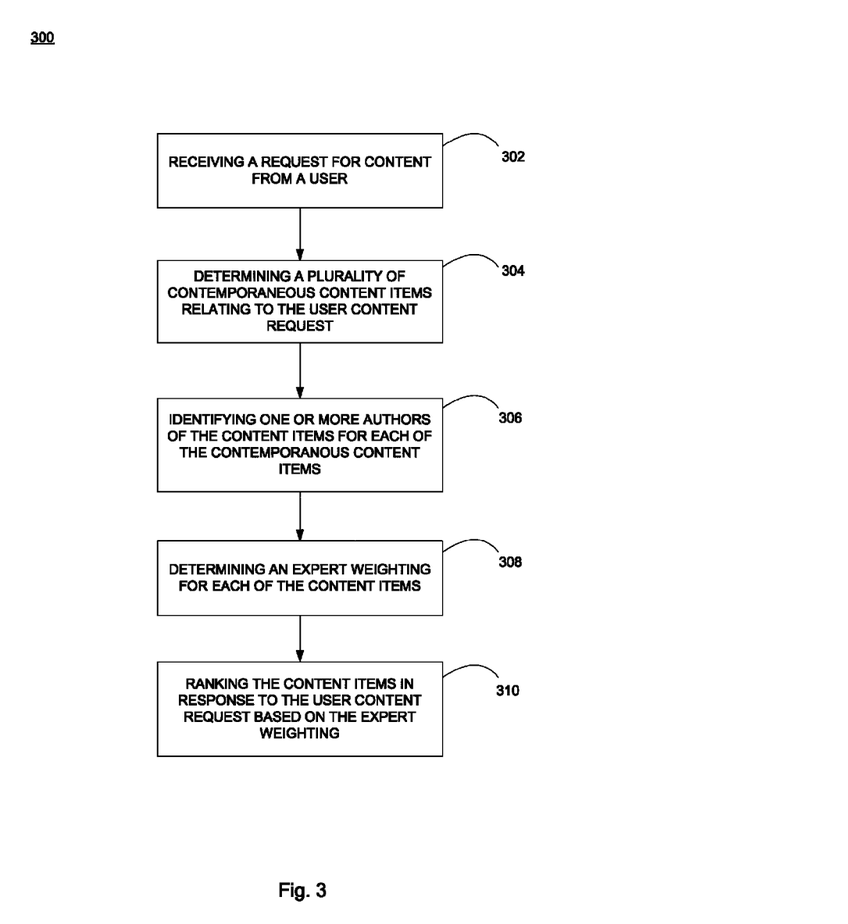
FIG. 3 illustrates a flowchart of a method for ranking contemporaneous content according to an embodiment of the present invention.

FIG. 3 presents a flowchart of a method 300 for ranking contemporaneous content according to an embodiment of the present invention. The method begins, step 302, by receiving a request for content from a user from Client 202. The search is received by the Search Engine 206.

A next step 304 includes determining a plurality of contemporaneous content items relating to the user content request. The contemporaneous content items include ultra-fresh content items having been only recently generated. The contemporaneous content may be retrieved from database 210 by the search engine to create a search result set. In this step, one example may be an event of a rumor of a high-tech product launch. A source location may be a technology blog dedicated to tracking and reporting on high tech rumors and news releases. Another source location may be a technical journal reporting on the blog article. This step may include determining that this web blog and the journal articles are the sources of contemporaneous content.

Since contemporaneous content items have not yet been crawled or indexed, information regarding their trustworthiness or usefulness is not available. A search engine may retrieve a plurality of contemporaneous content items relating to the user request but there is no way for the search engines to rank them in a conventional manner. The following discusses method steps for ranking contemporaneous content in the present invention by determining an expertise level for one or more authors of the contemporaneous content.

In a next step, step 306 includes indentifying one or more authors of the content items for each of the contemporaneous content items. Contemporaneous content items may contain more than one author. In such cases, all or some of the authors may be identified. In an alternative embodiment, a primary author may only be identified.

In step 308, the method further includes determining an expert weighting for each of the content items. Before determining expert weighting, expertise levels may first be determined for each author(s) of the contemporaneous content items. Expert weighting indicates an authority ranking determinative of the veracity of the source of the contemporaneous content items. Expertise level may be determined from a plurality of expert information from Expert Authority Database 222. An expert weighting may be determined based on the expertise levels for each of the content items. A given content item may have more than one author and as such, expertise weighting may be calculated according to the expertise of one, some or all of the authors of a particular content item. In one embodiment, authors with the highest expertise levels may only be used to calculate the expert weighting of a content item. In another embodiment, expert weighting may be calculated from the average expertise level of all the authors of a given contemporaneous content item.

Step 310 of the method of FIG. 3 includes ranking the content items in response to the user content request based on the expert weighting. The search engine may refer to Authority Filter 220 to rank and filter the contemporaneous results retrieved from database 210.

For example, suppose a user issues a query, "camera 50D flash accessory rumors." If the camera 50D is a very new product, and flash accessories are described by unofficial rumors so far, then search results will be short, and very recent. To rank these, the query would be first categorized into an area of interest, like "cameras/equipment." Authors of popular, well used content in this general area would be ranked for this topic. Then for the query "camera 50D flash accessory rumors," the author's ranking within this general topic would be used to rank the content for this specific query.

Using the above example of a rumored product launch, a web blog may be given a high authority ranking based on the expert weighting indicating it is a highly trustworthy source. By contrast, it is also possible that another source could be a secondary, less reliable web blog indicating the product rumor. This less reliable web blog may be less reliable for any number of reasons, such as it regularly broadcasts various rumors, is associated with a competing business, or is associated with an illegal stock manipulation scheme, just by way of example. Using the expert weighting, this particular web location is then given a low authority for search results.

Based on the information gathered from the Authority Database 222, Filter Authority 220 is able to rank search results retrieved by the Search Engine 206 for users performing search requests. The ranked search results are then returned by the search engine to the search results page of the client.

In addition to expert weighting, the ranking of contemporaneous content may also be based on a weighted sum of one or more factors using any suitable weighting technique. For example, ranking may be based on the age of a particular document, the content of document, geography of the user requesting content, merely by way of example.

Contemporaneous results may be ranked and displayed alone or in combination with indexed web content. Indexed content may be merged with contemporaneous content items in a search result or displayed separately from each other, i.e., shown side-by-side or in different panels.

Contemporaneous content may also be displayed for a search result upon a specific selection, by default or by submitting a special keyword in a query. The search engine 106 is thereby operative to present at least a portion of the contemporaneous content items in response to the user request.

In additional embodiments, the user content request can also include indexed or existing web content. The search results can include a mixture of indexed content and contemporaneous content. The indexed content can be ranked using existing techniques and combined with the authority ranking described herein for the contemporaneous content. It is also noted that the search results can be continually updated in a synchronous or asynchronous manner. As described below, once enough processing data is available for the ultra-fresh content, this content can then be considered indexed content and ranked based on existing techniques, so content matures, the pool of contemporaneous content and indexed content changes. With the change in underlying search result data, the search results themselves can be managed and modified accordingly.

Figure 4:
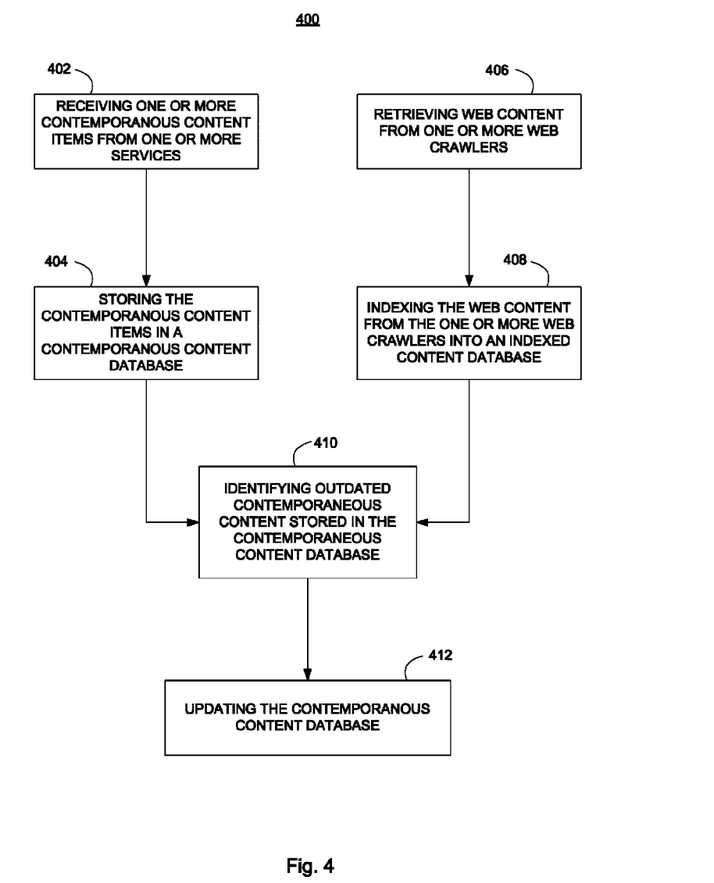
FIG. 4 illustrates a flowchart of a method for updating contemporaneous content according to an embodiment of the present invention.

FIG. 4 illustrates another embodiment, whereby processing operations provides for updating contemporaneous content, including processing content items from a web crawler. The method of FIG. 4 may be processed in the systems of FIGS. 1 and 2 or any other suitable processing environment. FIG. 4 presents a method 400 for according to an embodiment of the present invention.

In this embodiment, the first step, step 402 is receiving one or more contemporaneous content items from one or more sources. Feed Listener 208 may perform the receiving of the one or more contemporaneous content items.

In a next step, step 404 includes storing the contemporaneous content items in a contemporaneous content database. After Feed Listener 108 receives the contemporaneous content items from step 402, the content items may be stored in Contemporaneous Content Database 210.

In a concurrent or next step, step 406 includes retrieving web content from one or more web crawlers. Web Crawler 214 may perform the retrieving of the web content.

In another concurrent or next step, step 408 includes indexing the web content from the one or more web crawlers into an indexed content database. Web content from crawler 214 may be indexed into Indexed Content Database 216.

Steps 402 and 404 may be performed as parallel processes to steps 406 or 408. The set of steps 402, 404 and 406, 408 need not perform in any order with respect to each other but they may be performed sequentially. These steps may be concurrent processes performed either synchronously or asynchronously and may be independent of each other.

A next step, step 410 includes identifying outdated contemporaneous content stored in the contemporaneous content database. In this embodiment, a processing operation of Synchronizer 226 may receive communications from crawler 214 or sample information from Indexed Content Database 216 to gather a list of content items. This list of content items may be used to update Contemporaneous Content Database 210, which will be discussed in detail for the following step. In another embodiment, Synchronizer 226 may instead maintain a list of contemporaneous content items stored in database 210. This list of contemporaneous items may be checked against the web crawler or Indexed Content Database 216 to determine content items to update in database 210, if any.

In a next step, step 412 includes updating the contemporaneous content database. Contemporaneous content items that are determined by Synchronizer 226 to have been crawled or indexed in database 216 are deleted or purged from database 210. Contemporaneous content items identified in step 410, content items may be flagged or marked for deletion. In one embodiment, signals may be sent from synchronizer 226 for deletion or updating of database 210. In an alternative embodiment, a separate scheduler, not illustrated, may perform the scheduling operations. Identified contemporaneous content may be scheduled for deletion as a batch transaction.

Contemporaneous content that match the items identified on the list from step 410, are deleted or replaced from database 210 as they are no longer considered contemporaneous content once they have been crawled and indexed by the search engine. Deletion of items from database 210 may occur at periodic intervals or may be performed in real-time, as content items are crawled or indexed. Periodic intervals may be on an hourly, daily, or weekly basis, etc.

Contemporaneous content may become irrelevant or outdated within a matter of a few days or hours. Once the web crawler has visited the page and the search engine has indexed it may no longer be considered contemporaneous content as the process of crawling and search engine indexing has taken longer than a contemporaneous content's lifespan of being contemporaneous. Once this occurs, contemporaneous content may be transitioned over to becoming indexed web content.

It is understood that search engines provide effective solutions to standard searching operations, but based on the crawling data cataloging nature of these systems, problems can arise in real time activities. Based on the expert weightings, the present method and system provides not only time sensitive search results, but also performs authority rank to improve the accuracy and benefit of the search results. The authority ranking allows for presentation of users with highest quality results in primary result positions, including account for contemporaneous sources as described above.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for weighting contemporaneous content, the method comprising:

receiving request for content items in the form of a query;

in response to a user content request, determining content items indexed by one or more web crawlers in an indexed content database and concurrently determining a plurality of contemporaneous content items relating to the user content request, the contemporaneous content items including content items stored in a contemporaneous content item database that have not been indexed by the one or more web crawlers;

for each of the contemporaneous content items, identifying one or more authors of the contemporaneous content items;

determining an expertise level for the one or more authors;

determining an expert weighting for each of the contemporaneous content items based on the expertise level for the corresponding one or more authors;

ranking the contemporaneous content items in response to the user content request based on the expert weighting;

identifying outdated contemporaneous content items in the contemporaneous content item database by comparing the indexed content items with the contemporaneous content items, and deleting or replacing contemporaneous content items stored in the contemporaneous content item database that match indexed content items; and presenting at least a portion of the contemporaneous content items in response to the user content request.

2. The method of claim 1 wherein determining an expert weighting for the authors comprises determining from past credentials, user feedback, ratings or popularity.

3. The method of claim 1 wherein the one or more contemporaneous contents items comprises instant messages, syndication feeds, blobs, forums and social networking sites.

4. The method of claim 1 further comprising:

presenting at least a portion of the indexed content items with the at least a portion of the contemporaneous contents items in response to the user request.

5. The method of claim 4, wherein the presentation is in the form of a search results page, the method further comprising:

updating the search results page to include additional contemporaneous content.

6. The method of claim 5, wherein the updating is done asynchronously.

7. A system for weighting contemporaneous content, the system comprising:

a memory device having executable instructions stored therein; and a processing device, in response to the executable instructions, operative to:

receive request for content items in the form of a query;

in response to a user content request, determine content items indexed by one or more web crawlers in an indexed content database and concurrently determine a plurality of contemporaneous content items relating to the user content request, the contemporaneous content items including content items stored in a contemporaneous content item database that have not been indexed by the one or more web crawlers;

store the contemporaneous content items in a contemporaneous content database;

for each of the contemporaneous content items, identify one or more authors of the contemporaneous content items;

determine an expertise level for the one or more authors;

determine an expert weighting for each of the contemporaneous content items based on the expertise level for the corresponding one or more authors;

rank the contemporaneous content items in response to the user content request based on the expert weighting;

identify outdated contemporaneous content items in the contemporaneous content item database by comparing the indexed content items with the contemporaneous content items, and deleting or replacing contemporaneous content items stored in the contemporaneous content item database that match indexed content items; and present at least a portion of the contemporaneous content items in response to the user content request.

8. The system of claim 7 wherein determining an expert weighting for the authors comprises determining from past credentials, user feedback, ratings or popularity.

9. The system of claim 7 wherein the one or more contemporaneous contents items comprises instant messages, syndication feeds, blogs, forums and social networking sites.

10. The system of claim 7, the processing device further operative to:

present at least a portion of the indexed content items with the at least a portion of the contemporaneous contents items in response to the user request.

11. The system of claim 10, wherein the presentation is in the form of a search results page, the processing device further operative to:

update the search results page to include additional contemporaneous content.

12. The system of claim 11, wherein the updating is done asynchronously.

13. A non-transitory machine readable media comprising program code that when executed by a programmable processor causes execution of a method for weighting contemporaneous content, the media comprising:

computer program code for receiving request for content items in the form of a query;

computer program code for, in response to a user content request, determining content items indexed by one or more web crawlers in an indexed content database and concurrently determining a plurality of contemporaneous content items relating to the user content request, the contemporaneous content items including content items stored in a contemporaneous content item database that have not been indexed by the one or more web crawlers;

computer program code for storing the contemporaneous content items in a contemporaneous content database;

computer program code for, for each of the contemporaneous content items, identifying one or more authors of the contemporaneous content items;

computer program code for determining an expertise level for the one or more authors;

computer program code for determining an expert weighting for each of the contemporaneous content items based on the expertise level for the corresponding one or more authors;

computer program code for ranking the contemporaneous content items in response to the user content request based on the expert weighting;

computer program code for identifying outdated contemporaneous content items in the contemporaneous content item database by comparing the indexed content items with the contemporaneous content items, and deleting or replacing contemporaneous content items stored in the contemporaneous content item database that match indexed content items; and computer program code for presenting at least a portion of the contemporaneous content items in response to the user content request.

14. The non-transitory machine readable media of claim 13 wherein computer program code for determining an expert weighting for the authors comprises determining from past credentials, user feedback, ratings or popularity.

15. The non-transitory machine readable media of claim 13 wherein the one or more contemporaneous contents items comprises instant messages, syndication feeds, blogs; forums and social networking sites.

16. The non-transitory machine readable media of claim 13 further comprising:
computer program code for presenting at least a portion of the indexed content items with the at least a portion of the contemporaneous contents items in response to the user request.

17. The non-transitory machine readable media of claim 16, wherein the presentation is in the form a search results page, the media further comprising:
computer program code for updating the search results page to include additional contemporaneous content.

* * * * *